United States Patent [19]

Wada

[11] Patent Number: 5,050,208
[45] Date of Patent: Sep. 17, 1991

[54] RELAYING DESTINATION AND DESIGNATION SYSTEM

[75] Inventor: Yoshinori Wada, Miura, Japan

[73] Assignee: Ricoh Company, Ltd., Tokyo, Japan

[21] Appl. No.: 494,752

[22] Filed: Mar. 16, 1990

Related U.S. Application Data

[63] Continuation-in-part of Ser. No. 262,136, Oct. 21, 1988, abandoned, which is a continuation of Ser. No. 57,639, Jun. 12, 1987, abandoned, which is a continuation of Ser. No. 751,526, Jul. 3, 1985, abandoned.

[30] Foreign Application Priority Data

Jul. 5, 1984 [JP] Japan .................................. 59-138025

[51] Int. Cl.⁵ .......................................... H04M 11/00
[52] U.S. Cl. .................................................... 379/100
[58] Field of Search ..................... 379/100, 93, 96, 97, 379/98, 221; 358/407

[56] References Cited

U.S. PATENT DOCUMENTS

| | | | |
|---|---|---|---|
| 3,958,088 | 5/1976 | Vieri | 358/257 X |
| 4,106,060 | 8/1978 | Chapman, Jr. | 379/100 X |
| 4,113,992 | 9/1978 | Gorham et al. | 379/100 |
| 4,317,136 | 2/1982 | Keyt et al. | 358/257 X |
| 4,506,111 | 3/1985 | Takenouchi et al. | 379/96 X |
| 4,532,379 | 7/1985 | Tsukioka | 358/407 |
| 4,573,083 | 2/1986 | Shimizu | 358/407 |
| 4,586,086 | 4/1986 | Ohzeki | 358/257 X |
| 4,607,289 | 8/1986 | Kurokawa | 358/257 |
| 4,642,697 | 2/1987 | Wada | 358/257 |
| 4,905,273 | 2/1990 | Gordon et al. | 379/221 |

FOREIGN PATENT DOCUMENTS

| | | | |
|---|---|---|---|
| 54-122918 | 9/1979 | Japan | 358/257 |
| 0014654 | 1/1983 | Japan | 358/407 |
| 59-61361 | 7/1984 | Japan | 358/257 |
| 59-185462 | 10/1984 | Japan . | |
| 0096945 | 5/1985 | Japan | 358/407 |
| 0048553 | 2/1989 | Japan | 358/407 |
| 2089619 | 6/1982 | United Kingdom | 358/257 |

Primary Examiner—Jin F. Ng
Assistant Examiner—Stella L. Woo
Attorney, Agent, or Firm—Oblon, Spivak, McClelland, Maier & Neustadt

[57] ABSTRACT

A relaying destination and designation system is disclosed which uses a facsimile apparatus having a store and simulcast function as a relay station so as to relay transmission of image data from a transmission request station to a remote destination via the relay station. The transmission request station is capable of instructing the relay station whether or not the latter should convert telephone numbers of designations on a destination-by-destination basis.

1 Claim, 7 Drawing Sheets

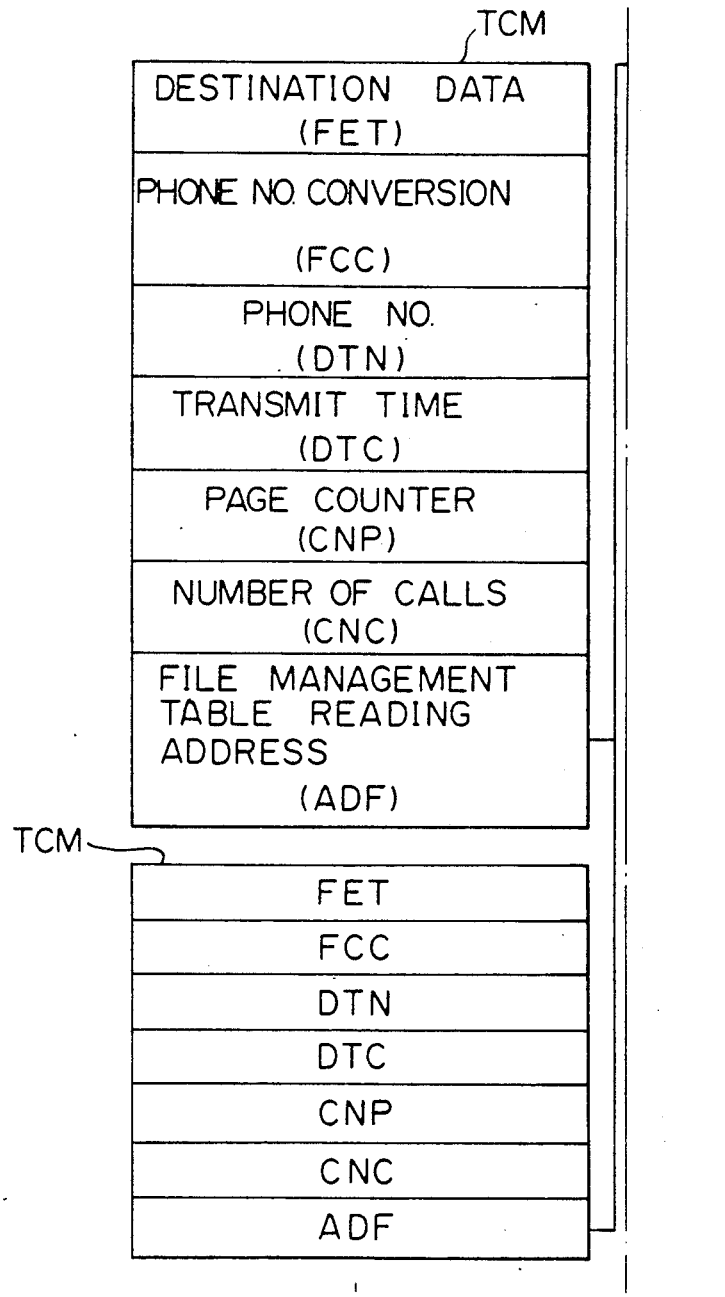

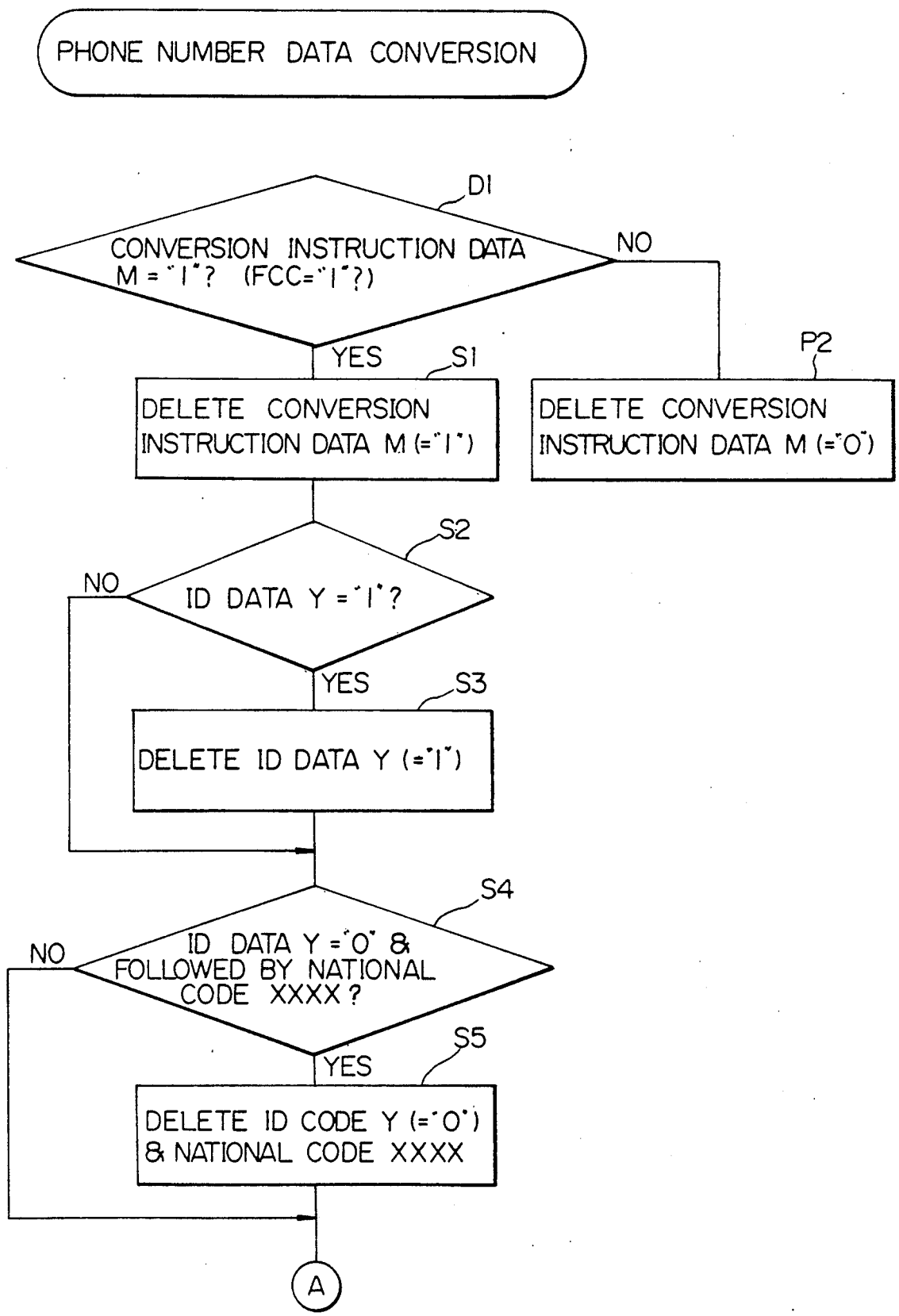

RELAYING DESTINATION AND DESIGNATION SYSTEM

CROSS REFERENCE TO RELATED APPLICATION

This application is a continuation-in-part of copending patent application Ser. No. 07/262,136, filed Oct. 21, 1988, now abandoned, which is a continuation of patent application Ser. No. 07/057,639, filed June 12, 1987, now abandoned, which is a continuation of patent application Ser. No. 06/751,526, filed July 3, 1985, now abandoned

BACKGROUND OF THE INVENTION

The present invention relates to an improved relaying destination and designation system for facsimile transmission which is applicable to a relayed simulcast network.

A relayed simulcast network uses a facsimile apparatus having a store and sequential transmission function as a relay station and promotes the economical transmission of data to multiple remote stations, or destinations. This kind of network finds application as a facsimile network for communications between, for example, main and branch offices of the same company. What is required in designating destinations from the transmission request station to transmit to a relay station is simply the entry of the telephone numbers assigned to the respective destinations. It has been customary to assign codes for the telephone numbers of the destinations at the relay stations so that the operator at the transmission request station may easily enter the telephone numbers. Specifically, when originating a call, an operator usually enters a telephone number with an area code of the given terminal as a reference. Hence, in the case where the destination and the relay station are situated in the same area as the transmission request station, if the operator is allowed to enter the telephone number in such a manner as to include an area code in the telephone number of the destination, the operator will intuitively conceive the destination's number just as in usual origination of calls and, therefore, successfully enter the destination's number without errors.

Where the designated destination's number shares the same area code with the relay station, the relay station removes the area code and calls the destination using only the exchange number and subscriber's number. Likewise, where the destination is situated in the same area as the transmission request station, the operator at the latter need enter only the exchange number and subscriber's number as the destination's number, without adding the area code. When the destination's number lacks an area code, the relay station determines that the transmission request station and the designation are located in the same area and, thereby, calls the destination using a telephone number which is the combination of the area code associated with the transmission request station and the destination's number.

In such a manner, the destination is called by using a destination's telephone number entered with the transmission request station as a reference and adding or converting this to a telephone number which uses the area code of the relay station as a reference, thereby promoting the failure-free manipulation of the operator at the transmission request station.

The prior art system discussed above works in a desirable manner so far as a network is in the same nation. When it comes to an internationally routed sequential relayed network, however, the processing becomes impractical due to the variety of telephone systems which differ greatly from one nation to another.

SUMMARY OF THE INVENTION

It is therefore an object of the present invention to eliminate the problem particular to the prior art system as described above.

It is another object of the present invention to provide a relaying destination and designation system which is applicable to a wide-range relayed sequential network.

It is another object of the present invention to provide a generally improved relaying destination and designation system.

In accordance with the present invention, in a system for allowing a transmit station to designate a destination so that image data may be transmitted from a facsimile apparatus at the transmit station to a facsimile apparatus at a receive station, or the destination, via a relay station which has a facsimile apparatus having a store and sequential broadcast function, the facsimile apparatus at the relay station has a function of converting a telephone number of the destination to a telephone number with the relay station as a reference. The facsimile apparatus at the transmit station is constructed to transmit to the relay station conversion instruction data for instructing the relay station whether or not it should specify the telephone number of the destination with the relay station as a reference, together with the telephone number of the destination.

The above and other objects, features and advantages of the present invention will become more apparent from the following detailed description taken with the accompanying drawings.

BRIEF DESCRIPTION OF THE DRAWINGS

FIG. 2 shows the arrangement of FIGS. 2A and 2B;

FIGS. 2A and 2B show various tables for managing destination data and image data in accordance with the present invention;

FIGS. 5A and 5B are flowcharts representative of a procedure for converting a telephone number at a relay station.

DESCRIPTION OF THE PREFERRED EMBODIMENT

Figure 1:
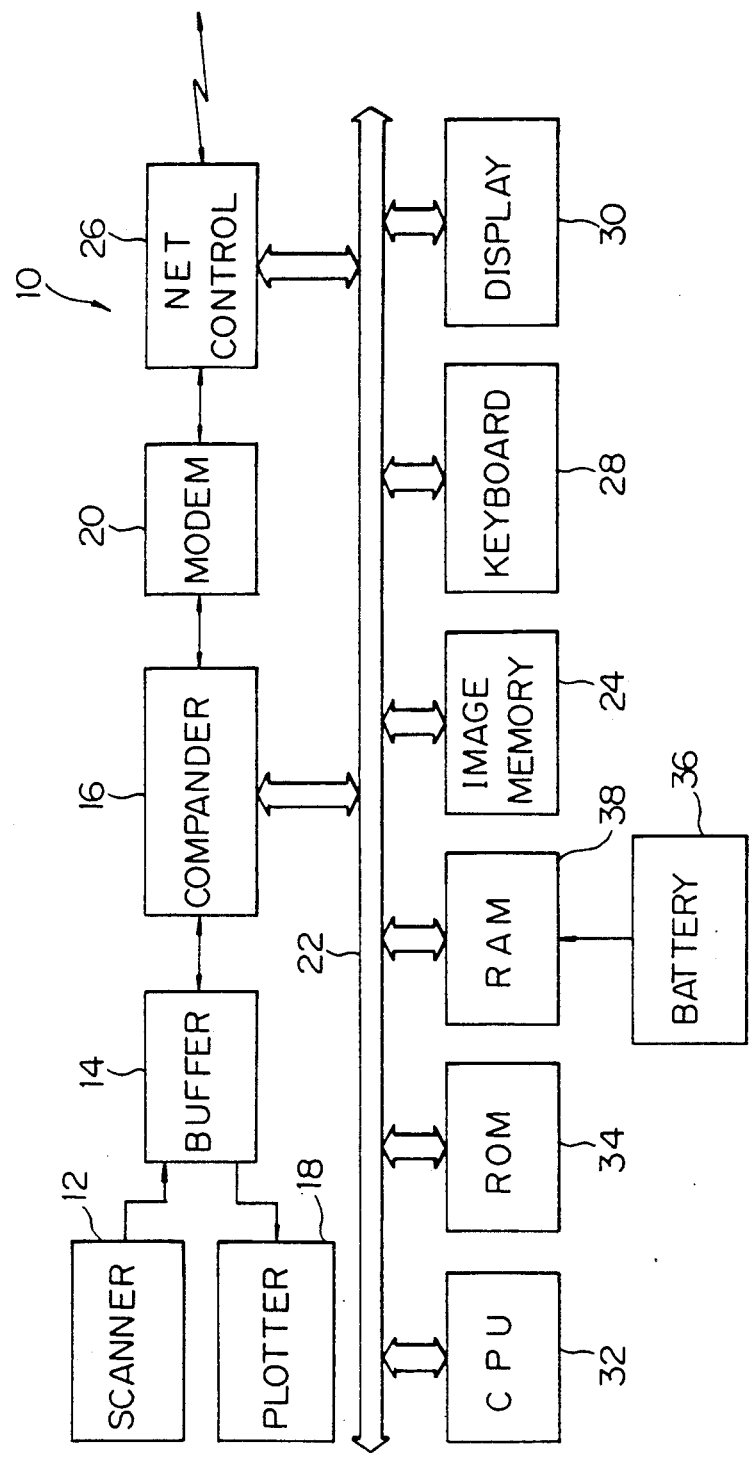
FIG. 1 is a schematic block diagram showing a facsimile apparatus to which the present invention is applicable and which represents a preferred embodiment of the present invention.

Referring to FIG. 1 of the drawings, a facsimile apparatus to which the relay destination and designation system of the present invention is applicable is shown and generally designated by the reference numeral 10. The facsimile apparatus 10 is of the type having an image memory and capble of serving as a relay station, a transmit (transmission request) station, or a receive station (destination). Specifically, the facsimile apparatus 10 includes a scanner 12 for reading a document or documents to be transmitted. The output signal of the scanner 12 is applied to a code compansion circuit 16 via a buffer 14. Meanwhile, data representative of a received document are applied from the code compansion circuit 16 to a plotter 18 via the buffer 14.

The code compansion circuit 16 compresses the video signal applied thereto from the buffer 14 according to a predetermined procedure, the output of the circuit 16 being routed to a modem 20. Another function assigned to the circuit 16 is the expanding of the received signals, which are applied thereto from the modem 20 back to original image signals based on a predetermined system. In this instance, the output of the circuit 16 is fed to the buffer 14 to be stored as record data. Still another function of the circuit 16 is the interfacing of the buffer 14 and modem 20 to an internal bus 22. Specifically, when image signals output from the scanner 12 are to be stored in the image memory 24, the compansion circuit 16 compresses the image signals outputted from the buffer 14 while converting them to parallel signals and, then, applies the parallel signals to the internal bus 22. On the other hand, when image data stored in the image memory 24 are to be fed to the plotter 18, the compansion circuit 16 converts parallel signals from the internal bus 22 to serial signals and, after expanding the serial signals, applies them to the buffer 14. To store received image data in the image memory 24, the compansion circuit 16 converts serial signals from the modem 20 to parallel signals and delivers them to the internal bus 22. Further, to transmit image data stored in the video memory to a desired remote station, or destination, the compansion circuit 16 converts parallel signals from the internal bus 22 to serial signals and applies them to the modem 20.

A network control circuit 26 controls a telephone circuit network to selectively set up, hold and interrupt a transmission circuit and has an automatic dial function and additionally has an automatic terminating function. The network control circuit 26 is interposed between the modem 20 an the telephone circuit network and supplied with dial data over the bus 22. A keyboard 28 comprises dial keys for designating a destination, various keys for selecting a desired mode, and other keys. A display 30 is adapted to display data keyed in through the keyboard 28 along with various instructions associated with the manipulation, and messages. An operator is allowed to operate the facsimile apparatus 10 with the keyboard 28 and display 30. As previously stated, compressed image data is written to the image memory 24 via the internal bus 22, and as such allows the capacity of the memory 24 to be fully utilized. A central processing unit (CPU) 32 performs predetermined transmission control and, at the same time, adequately controls the various structural elements described so far. A program which the CPU 32 should execute is stored in a read only memory (ROM) 34. A random access memory (RAM) is backed up by a battery 36 and provides a work area of the CPU 32.

Figure 2B:
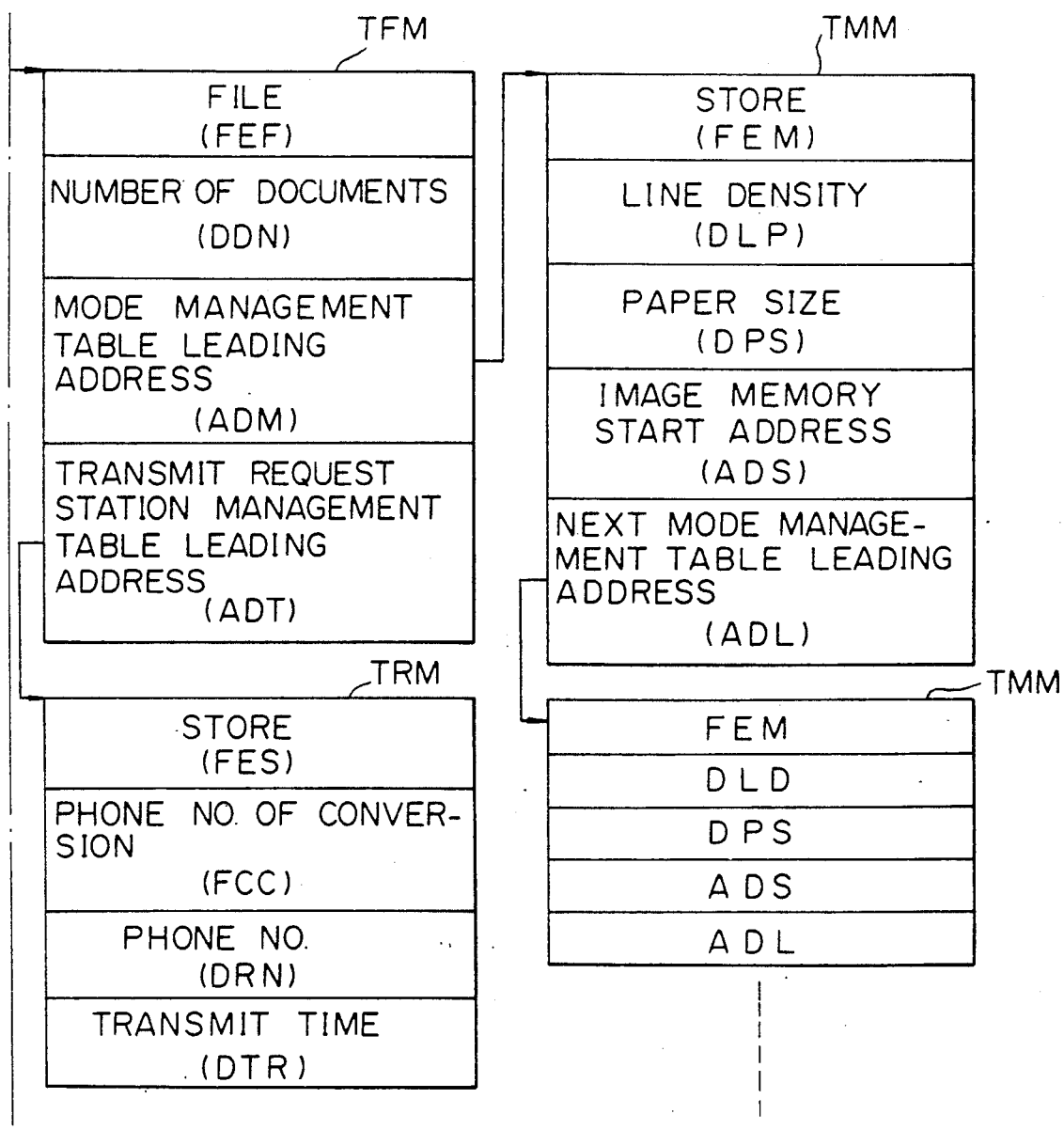

Further, the facsimile apparatus 10 has a function of repeating a call up to three consecutive times at predetermined intervals when it has failed to set up connection with a destination, and a function of resuming transmission of image data after the transmission has been interrupted by one cause or another, the interrupted page being first.

Where the facsimile apparatus 10 having the above-stated functions operates as a relay station, the CPU 32 of the apparatus supervises destination data and image data on the basis of various tables shown in FIG. 2. These tables are stored in the RAM 38.

In FIG. 2, a destination management table TCM is made up of a flag FET showing whether or not the table has stored valid destination data, a flag FCC showing whether or not a telephone number is stored in a coded format and therefore needs to be converted, telephone number data DTN represented by a 16-digit telephone number at maximum (inclusive of international and national codes), call time data DTC indicative of a time for originating a call (recalling), a page counter CNP indicative of the number of pages of documents which have been transmitted, a call number counter CNC indicative of the number of calls originated, and the leading address ADF of a file management table which will be described. Thirty such tables TCM, for example, may be stored in the RAM 38 so that the apparatus 10 is capable of performing sequential transmission (relay transmission) to up to thirty stations.

The file management table TFM comprises a flag FEF indicative of whether or not the table is managing a valid image data file, document number data DDN representative of the number of documents to be transmitted, a leading address ADM of a mode management table which manages image data of the first page as will be described, and a leading address ADT of a transmission request station management table which manages data associated with a transmission request station (transmit station).

The mode management table TMM comprises a flag FEM indicative of whether or not the table is managing valid image data, line density data DLD representative of a line density of image data, paper size data DPS indicative of a particular paper size, a start address ADS indicative of the beginning of an area which the particular image data managed by this table occupies in the image memory 24, and a next mode management table leading address ADL which, when image data are carried on a plurality of consecutive pages, stores the leading address of a mode management table adapted to manage video data of the next page and, when the next page is absent, stores end data (e.g. FF in hexadecimal number). The mode management table TMM is prepared in the same manner as the maximum number of documents which can be stored in the image memory 24 (e.g. forty). Among them, only those which correspond to the number of documents to be transmitted have their flags FEM made valid.

Further, the transmission request station management table TRM comprises a flag FES indicative of whether or not this table is managing valid data, a flag FCC indicative of whether or not a telephone number is stored in a coded format and requires that is be converted, telephone number data DRN represented by a telephone number having sixteen digits at maximum, and a transmission time data DTR indicative of a time for transmitting a report of the relay result (relay certificate) back to the transmission request station.

Figure 3:
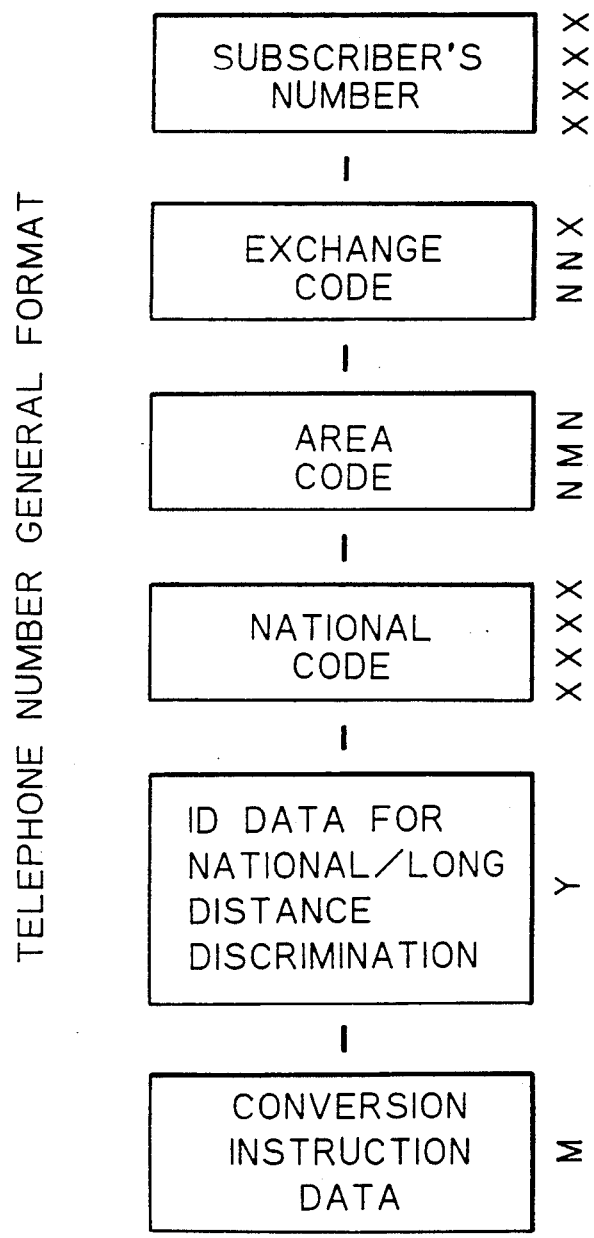
FIG. 3 shows a specific general format of a telephone number applicable to the present invention.

Referring to FIG. 3, the general format of a telephone number applicable to the system of the present invention is shown. As shown, the telephone number is headed by conversion instruction data (represented by "M") for instructing a relay station whether or not it should convert the telephone number. The conversion instruction data is followed by identification (ID) data (represented by "Y") for discriminating an international code and a long distance code. A national code (represented by "XXXX") and an area code (represented by "NMN") are positioned one after another next to the ID data. The telephone number ends with a subscriber number (represented by "XXXX"). In the format, both M and Y is either "0" (ZERO) or "1" (ONE), while X and N each ranges from 0 to 9 (or from 2 to 9 in U.S.). The conversion instruction data M indicates "conversion" when it is "1" or "non-conversion" when it is "0". The ID data Y indicates an international code when it is "0" or a long distance code when it is "1".

When one at any transmit station in the network desires to request the relay station transmission of data to a remote receive station, an operator loads documents to be transmitted in the scanner 12, then operates the keyboard 28 to set up a transmission request mode, and then enters a telephone number assigned to the receive station, or destination, while watching the display 30 for confirmation. In this instance, the operator enters conversion instruction information M (see FIG. 3) which shows whether or not it is necessary to convert the telephone number at the relay station, the conversion instruction data M heading the destination's telephone number. The conversion instruction data M is represented by "0" or "1" and may be predetermined depending on the nations in which the transmit station, relay station and receive station are located, as follows.

(1) Where all of the transmit, relay and receive stations are situated in the same nation, the conversion instruction data M is "1" and only the national telephone number assigned to the receive station is entered with the transmission request station as a reference. Assuming that all of the transmit, relay and receive stations are situated in U.S., for example, the format of a telephone number from the transmit station to the relay station will be "1 (=M)-NMN-NNX-XXXX" while the format of a telephone number from the relay station to the receive station will be "NMN-NNX-XXXX" However, when the relay station and receive station share the same area code, the format will be "NNX-XXXX".

(2) Where the transmit station and relay station are located in the same nation with the receive station located in a different nation, the conversion instruction data M is "0" and all of the international code, national code and national telephone number associated with the receive station are entered. For example, when the transmit station and relay station are located in U.S. and the receive station is located in Japan, the format of a telephone number from the transmit station to the relay station will be "0 (=M)-0(=Y)-XXXX-NMN-NNX-XXXX" while the format of a telephone number from the relay station to the receive station will be

"0 (=Y)-XXXX-NMN-NNX-XXXX"

(3) Where the transmit station and the relay station are located in different nations with the receive station situated in the same nation as the relay station, the conversion instruction data M is "0" and only the national telephone number assigned to the receive station is entered. In this case, a national telephone number with the relay station as a reference may be entered. Assuming that the transmit station is located in Japan and the relay station and receive stations are situated in U.S., the format of a telephone number from the transmit station to the relay station will be "0 (=M)-XXXX-NMN-NNX-XXXX" while the format of a telephone number from the relay station to the receive station will be.

"NMN-NNX-XXX". However, when the relay station and receive station are located at a long distance from each other, the format will be

"1 (=Y)-NMN-NNX-XXXX".

(4) Where all of the transmit, relay and receive stations are situated in different nations, the conversion instruction data M is "0" and all of the international code, national code and national telephone number associated with the receive station are entered. For example, when the transmit station, relay station and receive station are located in Japan, Netherlands and U.S., respectively, the format of a telephone number from the transmit station to the relay station will be "0 (=M)-0 (=Y)-XXXX-NMN-NNX-XXXX" while the format of a telephone number from the relay station to the receive station will be

"0 (=Y) XXXX-NMN-NNX-XXXX"

After the procedure described so far, the operator enters a telephone number of the relay station and, then, depresses a transmission start key to begin transmission. As soon as the transmit station calls the relay station to set up the transmission line, the former enters into an image signal pretransmission procedure informing the relay station of the request for transmission and, at the same time, sequentially transmitting the conversion instruction data and the telephone number or numbers destination by destination.

As the relay station receives the conversion instruction data and telephone number or numbers on a destination basis, it loads the conversion instruction data in the flags FCC of the destination management tables TCM and the telephone numbers in the telephone number data DTN.

The transmit station having transmitted all the destination data drives the scanner 12 to read desired documents and sends the resulting image data to the relay station.

On receipt of the image data, the relay station searches for an empty file management table TFM and sets the leading address of the empty table TFM in the file management table leading address ADF of each destination management table TCM. Thereafter, the relay station searches for a mode management table TMM which is empty and sets its leading address in the mode management table leading address ADM of the file management table TFM, while setting the leading address of the transmission request station management table in the transmission request management table leading address ADT. Then, the relay station finds an empty area out of the image memory 24 to load its leading address in the image memory start address ADS of the mode management table TMM, thereby storing the image data sequentially in the image memory 24 starting from that address. At the same time, the CPU 32 writes to the line density data DLD and paper size data DPS of the mode management table TMM their associated data. When the image data are carried on a plurality of consecutive sheets, a mode management table TMM which is empty is searched for each time so as to set its leading address in the next mode management table leading address ADL of a mode management table TMM one page before the searched table TMM; the leading address of an empty area of the image memory 24 is st in the image memory start address AD. In this manner, image data associated with the consecutive pages are written to the image memory 24.

After all the image data have been transmitted from the transmit station to the relay station, the call between those two stations are recovered to complete the transmission of a relay request.

Figure 4:
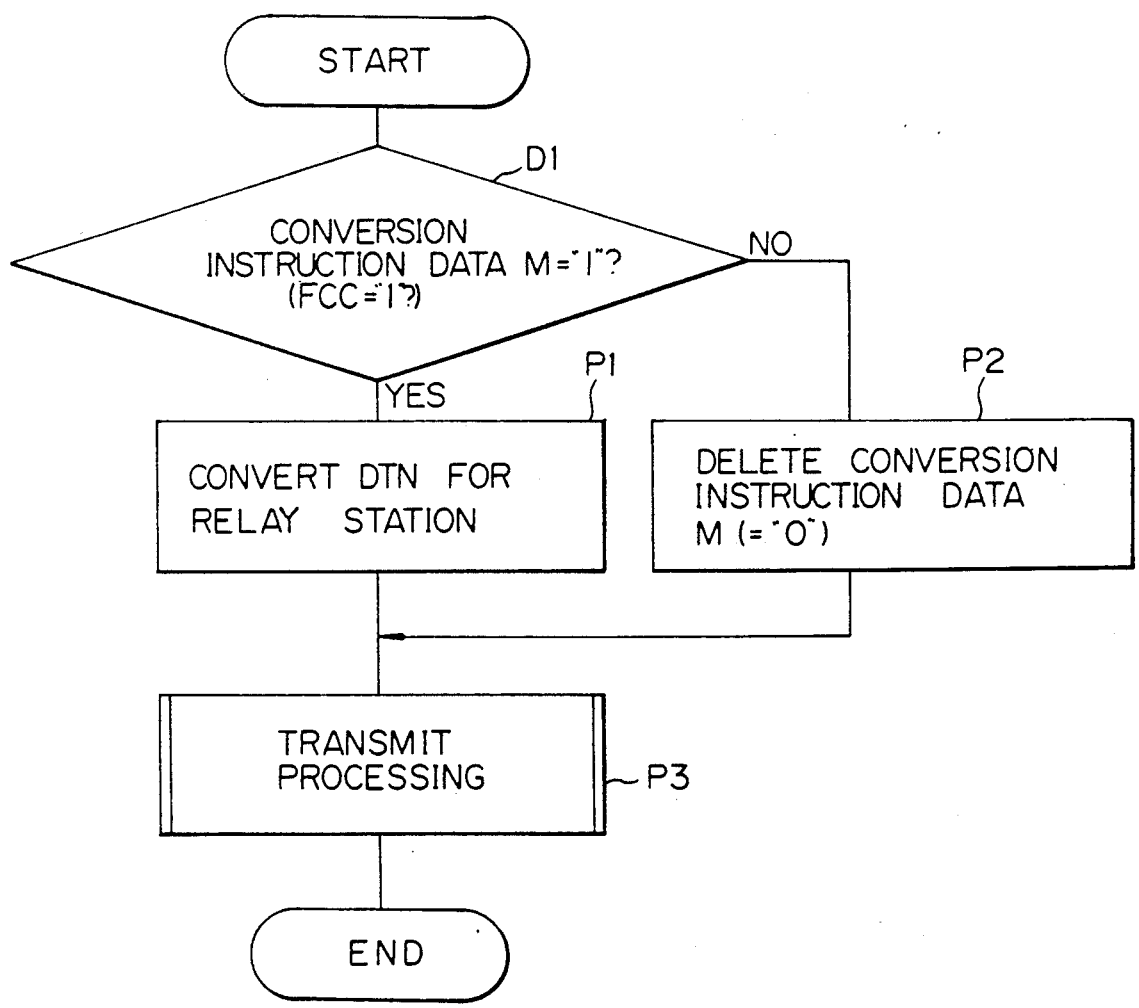
FIG. 4 is a flowchart demonstrating a part of processing which a relay station executes.

If the telephone number of the transmission request station does not include a national code and only has a national telephone number or has the same national code as the relay station, the relay station sets the flag FCC of the transmission request station management table TRM. Then, the relay station calls each of the designated receive stations referencing the destination management tables TCM in order to sequentially transmit the image data stored in the memory 24 to the respective receive stations. In this instance, as shown in FIG. 4, the relay station sees if the flag FCC of the destination management table TCM is "1", i.e., if the conversion instruction data M shown in FIG. 3 is "1" (decision D1). If M is "1" (the result of decision D1 is YES), the relay station changes the telephone number data DTN with its own terminal as a reference (processing P1). If M is "0", the conversion instruction data is deleted (processing P2). This is followed by image data transmission processing (processing P4).

Figure 5B:
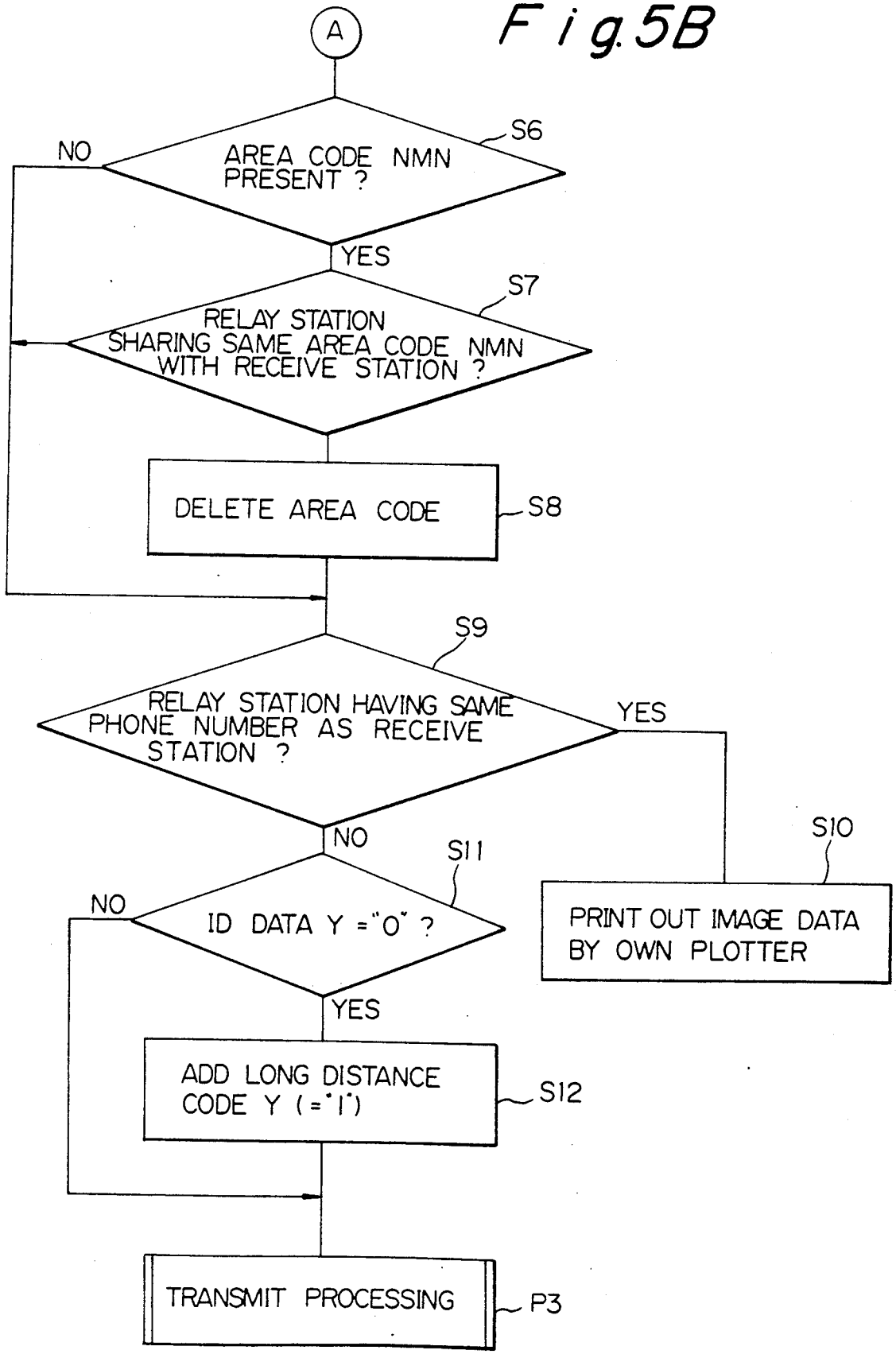

A reference will be made to FIGS. 5A and 5B for describing how the relay station converts a telephone number (processing P1, FIG. 4). In the figures, if the conversion instruction data M is "1" as determined by the decision D1, the relay station deletes the data M determining that the conversion of a telephone number is necessary (step S1). Then, the relay station sees if the telephone number has a long distance code (Y="1") (step S2). If the answer of the step S2 is YES, the relay station deletes the code Y (step S3). Subsequently, the relay station determines whether or not the telephone number has an international code (Y="0") and a national code (XXXX) (step S4). If the these codes Y and XXXX are present, the relay station deletes them (step S5). This is followed by a step S6 for determining whether or not the telephone number has an area code (NMN). If the answer of the step S6 is YES, the relay station sees if the area code meant for the receive station is identical with its own area code (step S7). If the answer of the step S7 is YES, the relay station deletes the area code and dials the receive station determining that it shares the same area code with the receive station (step S8); if otherwise, the relay station dials the receive station determining that its area code is different from the area code of the receive station. Then, the relay station determines whether or not the telephone number of the receive station is the same as its own telephone number (step S9) and, if the answer is positive, prints out the image data being transmitted by its own plotter. If the answer of the step S9 is negative, the program determines whether the call is a long distance call or a local call (step S11). In the case of a long distance call, "1" will be added to the beginning of the format of the telephone number (step S12).

In the event of transmitting the image data to each of the receive stations, the relay station repeats a call if the transmission has failed or repeats the transmission starting from an interrupted page as previously stated. On transmission of the image data to all the destinations, the relay station transmits the result in the fom of a relay certificate to the transmit station and, thus, terminates the relaying operation. When the relay station calls the transmit station for issuing a relay certificate, it changes or does not change the telephone number in the manner described with referenct to FIG. 3.

It should be noted that whether or not a telephone number should be changed at the relay station may be instructed in any desired mode other than the above-described mode.

In summary, it will be seen that the present invention provides a relaying destination and designation system which is capable of surely calling destinations distributed in a network, whether it be national or international, and with simple processing. This is because the system allows a transmission request station to instruct a relay station whether or not the latter should change a telephone number.

Various modifications will become possible for those skilled in the art after receiving the teachings of the present disclosure without departing from the scope thereof.

What is claimed is:

1. A system for transmitting fax data comprising:
 a plurality of stations each capable of sending and receiving facsimile data; wherein
 at least one of said stations may act as a relay station having a store and sequential transmission function and which further comprises:
 means for converting a telephone number of a destination station to a telephone number of the relay station as a reference;
 and further wherein at least one of said stations operates as a transmitting station wherein said transmitting station comprises:
 means to transmit to said station acting as a relay station, relay station conversion instruction data having valid data for validating a conversion function, of the facsimile apparatus, at the station acting as a relay station and conversion invalid data for invalidating said conversion data such that said conversion valid data is provided when the telephone number of a destination station is to be specified, with the transmitting station as a reference or to add said conversion invalid data to the telephone number of a destination station, when the telephone number of the destination is to be specified with the relay station as a reference; and
 further wherein said station acting as a relay station comprises:
 means to convert the telephone number by said means for converting if said conversion valid data is not added to the telephone number of the destination or not to convert the telephone number if said conversion valid data is added to the telephone number.

* * * * *